United States Patent [19]

Grolman et al.

[11] 3,832,890

[45] Sept. 3, 1974

[54] NON-CONTACT TONOMETER CORNEAL MONITORING SYSTEM

[75] Inventors: Bernard Grolman, Worcester; Robert G. Lavallee, Ashland, both of Mass.

[73] Assignee: American Optical Corporation, Southbridge, Mass.

[22] Filed: Dec. 29, 1971

[21] Appl. No.: 213,661

[52] U.S. Cl. .................................................. 73/80

[51] Int. Cl. .................................................. A61b 3/16

[58] Field of Search .......................... 351/6, 7; 73/80

[56] References Cited

UNITED STATES PATENTS

| | | | |
|---|---|---|---|
| 1,907,750 | 5/1933 | DeJarnette | 250/86 |
| 3,036,568 | 5/1962 | Stark | 351/6 |
| 3,181,351 | 5/1965 | Stauffer | 73/80 |
| 3,279,938 | 10/1966 | Schneeberger | 250/86 |
| 3,379,885 | 4/1968 | Nork | 351/7 |
| 3,473,868 | 10/1969 | Young et al. | 351/7 |
| 3,525,565 | 8/1970 | O'Neill et al. | 351/7 |
| 3,572,909 | 3/1971 | Van Patten et al. | 351/6 |

*Primary Examiner*—James J. Gill
*Assistant Examiner*—Anthony V. Ciarlante
*Attorney, Agent, or Firm*—Alan H. Spencer; William C. Nealon

[57] ABSTRACT

A non-contact tonometer in which the pneumatic, alignment, and corneal monitoring systems are all disposed along the same axis normal to the cornea. Monitoring light incident upon and reflected from the cornea is in the infrared range so as to be imperceptible by the patient.

5 Claims, 1 Drawing Figure

PATENTED SEP 3 1974 3,832,890
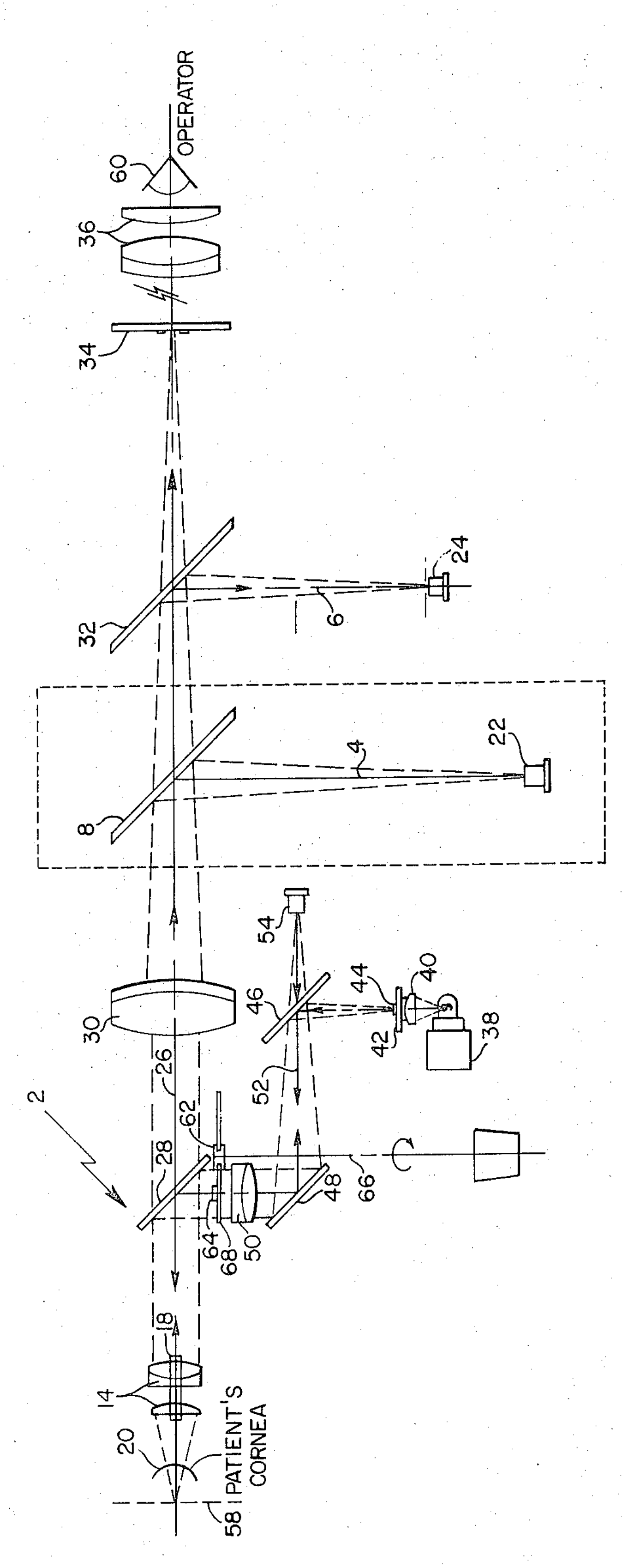

NON-CONTACT TONOMETER CORNEAL MONITORING SYSTEM

CROSS-REFERENCE

U.S. Pat. application Ser. No. 202,423, filed Nov. 26, 1971 and entitled "Improvements in a Non-Contact Tonometer."

BACKGROUND OF THE INVENTION

This invention relates to tonometry and is an alternative arrangement to the "Method and Apparatus for Measuring Intraocular Pressure" disclosed and claimed in U.S. Pat. No. 3,585,949 issued on June 22, 1971 to Bernard Grolman. In particular, this invention relates to an alternative corneal monitoring system for the non-contact tonometer described in the aforementioned patent.

The non-contact tonometer to which this invention relates operates by discharging an air pulse of a known force-time relationship onto the cornea of a patient. The resulting deformation of the cornea from convexity through applanation to concavity, and return, is observed as a function of time and thus correlated to intraocular pressure. In the arrangement described in the above mentioned patent, the corneal deformation is monitored by a light beam angularly directed at, and reflected from, the cornea. Maxima of detected reflected light flux indicate occurrences of applanation. This monitoring light is directed obliquely onto the cornea, for one reason, to avoid patient discomfort which would result from illumination directed normally at the eye.

SUMMARY OF THE INVENTION

It is an object of the present invention to provide a non-contact tonometer in which the alignment, pneumatic, and corneal monitoring systems are all aligned along a common axis.

Another object is to provide such an apparatus in a relatively compact arrangement.

Further objects, advantages and features of this invention will become apparent from the following description of one embodiment thereof, given in connection with the accompanying drawing.

Briefly, the invention is practiced in one form by a non-contact tonometer having common alignment, pneumatic, and corneal monitoring axes. Beam splitters disposed along this axis permit the superimposition therealong of desired inputs from the alignment and corneal monitoring systems. The alignment system directs a visible target along the axis, and the corneal monitoring system directs infra-red radiation along the same axis onto the cornea and senses reflected radiation therefrom.

DRAWING

The drawing is a schematic side view of the tonometer alignment, pneumatic, and corneal monitoring systems according to this invention.

DESCRIPTION

Referring now to the drawing, a non-contact tonometer is generally represented at 2 and is disposed between the cornea 20 of a patient and the eye 60 of an operator. The tonometer includes a pneumatic system of which only orifice tube 18 is shown, disposed along the instrument axis 26. A beam splitter 28, telescope lens 30, beam splitter 32, aiming reticle 34, and an eyepiece 36 are also disposed along the instrument axis 26 and mounted on suitable support structure which is immaterial to this invention.

An alignment system includes a light source 38, collecting lens 40, light transmitting plate 42, a fixation spot or target 44, a beam splitter 46, a mirror 48, and a collimating lens 50, all disposed along a projection axis 52 which joins axis 26 at the beam splitter 28. A light emitting diode 54 also radiates along projection axis 52, through beam splitter 46. A turret 62 is rotatable about axis 66 and carries a plurality of dioptric lenses 64 mounted on plane windows 68. When target 44 is illuminated, its image is projected along axis 52 and then along axis 26 and imaged by an objective lens 14 at image plane 58.

The foregoing elements are all disclosed and described in greater detail in our co-pending patent application Ser. No. 202,423, filed Nov. 26, 1971, now U.S. Pat. No. 3,756,073, wherein like elements are given the same reference numerals.

Referring again to the drawing, the apparatus further includes a corneal monitoring system disposed partly along a monitoring illumination axis 4, and partly along a monitoring readout axis 6. Illumination axis 4 joins axis 26 at a beam splitter 8. Similarly, readout axis 6 joins axis 26 at a beam splitter 32. The corneal monitoring system also includes a radiant energy source 22 on axis 4 and a photodetector 24 on axis 6. Elements 22 and 24 are both located at focal planes of telescope 30. Energy source 22 is preferably an infra-red source, for example, a diode emitting at 900 nm. Photodetector 24 is preferably one having enhanced sensitivity in this wave length range. Detector 24 is operatively connected to instrumentation, not shown, by which the light flux sensed by the photodetector 24 is recorded or otherwise read out as useful information. This feature is more fully described in the aforementioned U.S. Pat. No. 3,585,949.

In the operation of this invention, the apparatus having been aligned, the diode 22 emits infra-red radiation which is directed onto the cornea along axes 4 and 26. This infra-red radiation is incident upon and reflected from the cornea 20, back along axis 26 to the beam splitter 32 and to the photodetector 24. During the pneumatic pulse, the cornea undergoes deformation with a resulting change in the quantity of reflected flux sensed by the photodetector 24.

The light emitting diode 54 was described in the co-pending application as a source of infra-red radiation for the purpose of alignment. In that arrangement, a detector located at 24 was used to detect the occurrence of alignment whereupon to trigger the instrument to function. It is contemplated that this same light emitting diode 54 can be used for the dual purposes of providing alignment verification and the monitoring radiation described above as coming from energy source 22. In this event, the detector 24 will also serve dual purposes of sensing (alignment) radiation to trigger the instrument, and sensing (monitoring) radiation to monitor corneal deformation. In this alternative arrangement, the beam splitter 8 and the energy source 22 are unnecessary. These last mentioned elements are shown enclosed in a phantom enclosure which merely symbolizes that these elements are unnecessary in one embodiment of this invention.

It will be apparent that by the use of this infra-red monitoring light, which is invisible, the patient is unaware of its presence and therefore does not suffer the photoptic discomfort which would otherwise result from the direction of a relatively bright visible beam into the eye. Furthermore, it will be appreciated that this invention, by making it possible to monitor along the normal axis, facilitates a more compact in-line apparatus in which the alignment, pneumatic, and corneal monitoring systems are all disposed along the same axis.

The foregoing description of one embodiment of this invention is given by way of illustration and not of limitation. The concept and scope of the invention are limited only by the following claims and equivalents thereof which may occur to others skilled in the art.

What is claimed is:

1. A non-contact tonometer having a pneumatic system in which a fluid pulse is directed along a pneumatic axis and at a patient's corneal surface, and a monitoring system in which the effect of said pulse on said surface is determined, said pneumatic system including a control means, an alignment system disposed relative to an alignment axis coincident with said pneumatic axis, said alignment system having a visual alignment mode and an invisible verification mode, said visual alignment mode including an objective lens and an observation means disposed along said alignment axis and projection means to project a visible target image through said objective lens along said alignment axis toward the focal plane thereof and toward said corneal surface, said target image being reflected by said corneal surface along said alignment axis to form a visible reflected image at said observation means, said invisible verification mode including a manual actuating means, a source of invisible verification radiation, means to project an image of said source along said alignment axis toward the focal plane thereof and toward said corneal surface, said invisible source image being reflected by said corneal surface along said alignment axis toward said observation means, a beam divider disposed along said alignment axis between said objective and said observation means to direct said invisible source image to a verification image plane, a detector sensitive to said invisible verification radiation at said verification image plane, said detector being operatively connected to the control means of said pneumatic system responsive to a reflected source image coincident thereon to actuate the control means of said pneumatic system, said tonometer being characterized by a monitoring system including:

- a monitoring source of invisible radiation and means to project the same along said alignment axis toward the focal plane thereof and toward said corneal surface, said monitoring source image being reflected by said corneal surface along said alignment axis toward said observation means,
- a beam splitter disposed along said alignment axis between the objective and said observation means to direct the image of the monitoring source to a monitoring image plane, and
- a detector at said monitoring image plane sensitive to changes in monitoring light flux incident thereon.

2. The tonometer of claim 1 wherein said source of invisible verification radiation and monitoring source of invisible radiation are the same.

3. The tonometer of claim 2 wherein said invisible radiation is in the infra-red band.

4. The tonometer of claim 2 wherein said verification and monitoring image planes are coincident and said beam divider and beam splitter are coincident.

5. The tonometer of claim 1 wherein the intensity of the visible light source is less than the intensity of the invisible monitoring source.

* * * * *